United States Patent
Axnäs et al.

(10) Patent No.: US 9,713,144 B2
(45) Date of Patent: Jul. 18, 2017

(54) METHODS AND APPARATUS FOR ROUTING COMMUNICATION USING SLOTTED RESOURCES OF RADIO ACCESS MESH NETWORKS

(71) Applicant: Telefonaktiebolaget L M Ericsson (publ), Stockholm (SE)

(72) Inventors: Johan Axnäs, Solna (SE); Kumar Balachandran, Pleasanton, CA (US); Robert Baldemair, Solna (SE); Dennis Hui, Sunnyvale, CA (US); Hugo Tullberg, Nyköping (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 44 days.

(21) Appl. No.: 14/650,499

(22) PCT Filed: Dec. 10, 2012

(86) PCT No.: PCT/SE2012/051371
§ 371 (c)(1),
(2) Date: Jun. 8, 2015

(87) PCT Pub. No.: WO2014/092613
PCT Pub. Date: Jun. 19, 2014

(65) Prior Publication Data
US 2015/0312906 A1 Oct. 29, 2015

(51) Int. Cl.
*H04W 40/02* (2009.01)
*H04W 40/12* (2009.01)
(Continued)

(52) U.S. Cl.
CPC ......... *H04W 72/0446* (2013.01); *H04L 45/22* (2013.01); *H04W 28/26* (2013.01);
(Continued)

(58) Field of Classification Search
CPC . H04W 72/0446; H04B 17/24; H04B 17/327; H04B 17/345; H04B 7/15542; H04B 7/2121
See application file for complete search history.

(56) References Cited

U.S. PATENT DOCUMENTS

2008/0310343 A1 12/2008 Balachandran et al.
2009/0022170 A1* 1/2009 Mehta .................. H04W 52/286
370/410
(Continued)

FOREIGN PATENT DOCUMENTS

DE 102010033928 A1 2/2012
RU 2431945 C1 10/2011

*Primary Examiner* — Ayaz Sheikh
*Assistant Examiner* — Debebe Asefa
(74) *Attorney, Agent, or Firm* — Murphy, Bilak & Homiller, PLLC

(57) ABSTRACT

Methods and network nodes (700-720) route communications between pairs of source and destination nodes through network nodes (700-720) of a wireless communication system. One resource slot of a wireless communication link is selected (1200) between each of a sequence of the network nodes (700-720) along a communication route between one pair of the source and destination nodes. Another resource slot of the wireless communication link is selected (1202) between at least some of the sequence of the network nodes (700-720) along the communication route between the one pair of the source and destination nodes. Selection of the other resource slot between each of the sequence of the network nodes along the communication route can be constrained to selection among resource slots that are available from only the sequence of the network nodes along the communication route between the one pair of the source and destination nodes.

24 Claims, 10 Drawing Sheets

(51) Int. Cl.
*H04L 12/707* (2013.01)
*H04W 72/04* (2009.01)
*H04W 28/26* (2009.01)
*H04W 40/16* (2009.01)

(52) U.S. Cl.
CPC ........... *H04W 40/02* (2013.01); *H04W 40/16* (2013.01); *Y02B 60/50* (2013.01)

(56) References Cited

U.S. PATENT DOCUMENTS

| | | |
|---|---|---|
| 2009/0059814 A1 | 3/2009 | Nixon et al. |
| 2012/0236731 A1 | 9/2012 | Beaudin et al. |
| 2012/0294292 A1* | 11/2012 | Heinrich ............... H04W 40/14 370/336 |

* cited by examiner

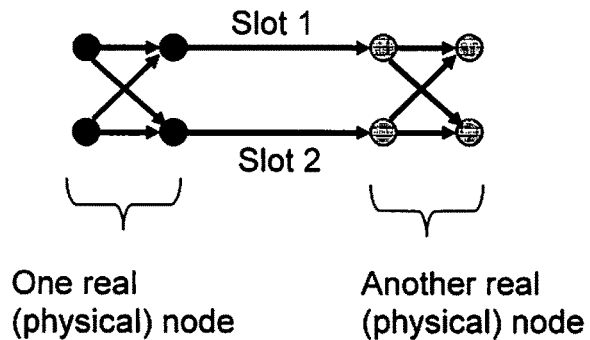
Figure 3
Basic representation 
Augmented repr. (a) 
Augmented repr. (b) 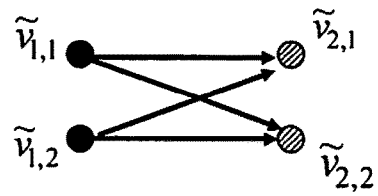
Augmented repr. (c) 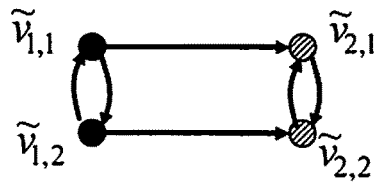
Augmented repr. (d) 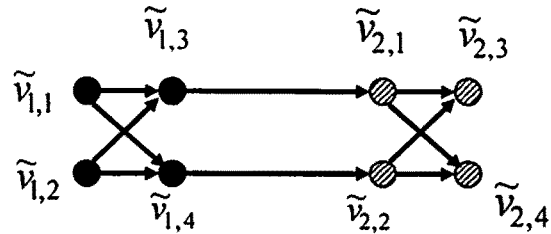
Figure 4

Communicate a resource allocation message to each of the sequence of network nodes along the communication route between the pair of the source and destination nodes to allocate the respective selected resource slots for communication of traffic in at least one direction between the source and destination nodes — 1500

*Figure 15*

For each of the other pairs of source and destination nodes, select one resource slot of a wireless communication link between each of a sequence of the network nodes along a communication route between the respective pair of the source and destination nodes — 1600

For each of the other pairs of source and destination nodes, select another resource slot of the wireless communication link between at least some of the sequence of the network nodes along the communication route between the respective pair of the source and destination nodes — 1602

*Figure 16*

Following selection of the other resource slot between at least some of the sequence of the network nodes along the communication route between the pair of the source and destination nodes, select one resource slot between each of a sequence of the network nodes along a communication route between another pair of the source and destination nodes — 1700

Select another resource slot of the wireless communication link between at least some of the sequence of the network nodes along the communication route between the another pair of the source and destination nodes — 1702

*Figure 17*

Adjust a planned transmission power level of a particular one of the resource slots of one of the network nodes responsive to an available communication rate of the particular one of the resource slots — 2100

Figure 21

Respond to a communication bottleneck being present in one of the network nodes along one of the communication routes which does not have a threshold available communication rate, by selecting at least one resource slot of a substitute other network node to bypass the bottleneck one of the network nodes — 2200

Figure 22

Select a replacement resource slot for a previously selected resource slot of one of the network nodes within the sequence of the network nodes along the communication route between one pair of the source and destination nodes in response to a level of communication interference that will be created by a selection of another resource slot of one of the network nodes along another communication route between another respective pair of the source and destination nodes — 2300

Figure 23

METHODS AND APPARATUS FOR ROUTING COMMUNICATION USING SLOTTED RESOURCES OF RADIO ACCESS MESH NETWORKS

TECHNICAL FIELD

The present disclosure relates to radio access networks and, more particularly, to routing communications through a mesh of radio access network nodes.

BACKGROUND

To cope with the exponential growth in wireless data traffic, it is anticipated that substantially denser deployment of base stations or wireless access nodes will be required in the future. The feasibility of a very dense deployment of wireless radio access nodes is predicated on the existence of a backhaul network that can provide high-data-rate transport for each individual access node in the network. From the point of view of maximizing capacity, optical-fiber-based backhaul solutions are probably the most desirable ones and are most suitable for new constructions. However, in existing buildings and infrastructure, the cost of installation of new fibers to every access node in a very dense network can be prohibitive.

An alternative to the fiber backhaul solution is the wireless self-backhaul solution, where the same access spectrum is used to provide transport. With self-backhauling, an access node may serve not only its own assigned user equipments (UEs) in its vicinity but also its neighboring access nodes as a relaying node in order to route data towards and/or from an information aggregation node in the network. FIG. 1 illustrates a group of self-backhauling radio access nodes 100 that form a multi-hop mesh network. The access nodes 100 cooperatively route each other's traffic to and from an aggregation node 104 through wireless radio communication links 102. The routes that the traffic should follow are decided by a routing algorithm. In general, a network may contain more than one aggregation node and any number of access nodes.

A significant difference compared to a fiber network (or any other wired network) is that in the wireless network, different nodes transmitting at the same time can interfere with each other, leading to reduced data rates. A common way to keep interference at an acceptable level is to introduce fractional reuse, which means that not all nodes are allowed to transmit at the same frequency at the same time. Such fractional reuse is often in practice realized by dividing the available spectrum into frequency slots (i.e. subbands within the total system bandwidth), and ensuring that nearby nodes do not use the same frequency slot for transmission at the same time. Instead of frequency slots, the fractional reuse process may alternatively use time slots (i.e. each transmission frame is split into a number of short time intervals), with analogous results. A combination of both time and frequency slots may also be used by fractional reuse processes.

When slots are used in a network (which is henceforth referred to as a slotted network), a routing algorithm must not only determine which sequence of nodes traffic to a certain destination should follow, but also which slots should be used for each hop along the route through the sequence of nodes. Finding optimal routes is in general an extremely complex task and, in practice, reduced-complexity suboptimal routing algorithms have been used to reduce processing overhead. These reduced-complexity routing algorithms may result in suboptimal utilization of available resources of the radio access nodes, unnecessary delays in communication of traffic, and other avoidable limitations on quality of service provided to communications between source and destination nodes.

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

SUMMARY

To address the foregoing problems identified in the prior art, the Detailed Description presented hereinafter will describe several systems and methods directed to a reduced-complexity routing algorithm for routing communications using slotted resources of a mesh of radio access network nodes. Various embodiments disclosed herein may decrease the computational requirements to determine a multi-slot route that makes all the (slot) routes to a given destination node go via the same sequence of (real) nodes. The multi-slot route determination may have reduced routing complexity relative to multi-path routing and avoid out-of-order delivery of TCP traffic which can be otherwise result from multi-path routing. Moreover, because multiple slots in each link may be used for traffic to a given destination, available link capacity can be better utilized for traffic.

One embodiment is directed to a method by a network node for routing communications between pairs of source and destination nodes through network nodes of a wireless communication system. The method includes selecting one resource slot of a wireless communication link between each of a sequence of the network nodes along a communication route between one pair of the source and destination nodes. Another resource slot of the wireless communication link is selected between each of the sequence of the network nodes along the communication route between the one pair of the source and destination nodes.

In further related embodiments, for each of the other pairs of source and destination nodes, one resource slot of a wireless communication link is selected between each of a sequence of the network nodes along a communication route between the respective pair of the source and destination nodes. Moreover, for each of the other pairs of source and destination nodes, another resource slot of the wireless communication link is selected between each of the sequence of the network nodes along the communication route between the respective pair of the source and destination nodes. The selection of the other resource slots between each of the sequence of the network nodes along the communication route between the one pair of the source and destination nodes can be constrained to selection among resource slots that are available from only the sequence of the network nodes along the respective communication route.

Another embodiment is directed to a route determining network node for routing communications between pairs of source and destination nodes through network nodes of a wireless communication system. The route determination network node includes a single-slot route determination unit and a further slot route determination unit. The single-slot route determination unit is configured to select one resource slot of a wireless communication link between each of a sequence of the network nodes along a communication route between one pair of the source and destination nodes. The further slot route determination unit configured to select another resource slot of the wireless communication link between each of the sequence of the network nodes along the communication route between the one pair of the source and destination nodes.

Other methods, network nodes, and system according to embodiments of the invention will be or become apparent to one with skill in the art upon review of the following drawings and detailed description. It is intended that all such additional methods, network nodes, and system be included within this description, be within the scope of the present invention, and be protected by the accompanying claims. Moreover, it is intended that all embodiments disclosed herein can be implemented separately or combined in any way and/or combination.

BRIEF DESCRIPTION OF THE DRAWINGS

The accompanying drawings, which are included to provide a further understanding of the disclosure and are incorporated in and constitute a part of this application, illustrate certain non-limiting embodiment of the invention. In the drawings:

FIG. 3 illustrates a graph representation of slot structure for two nodes with a single-direction link consisting of two slots;

FIG. 4 illustrates a basic graph representation and four augmented graph representations;

FIGS. 12-23 illustrate flowcharts of related operations and methods by a network node, such as the route determining node of FIG. 6, according to some embodiments.

DETAILED DESCRIPTION

The invention will now be described more fully hereinafter with reference to the accompanying drawings, in which embodiments of the invention are shown. The invention may, however, be embodied in many different forms and is not to be construed as limited to the embodiments set forth herein.

Multi-Hop Networks and Related Terminology:

Multi-hop mesh network terminology and associated processes for routing traffic through mesh networks are explained below. At least some embodiments of the present disclosure may be incorporated into one or more of these multi-hop mesh networks.

A wireless mesh network can be represented by a theoretical graph. Different ways to graphically represent mesh networks are well known in relevant literature. While some graph representations are relatively simple and only reflect the basic topology of a network, other graph representations are more advanced and also reflect the slot structure of a mesh network.

Figure 2:
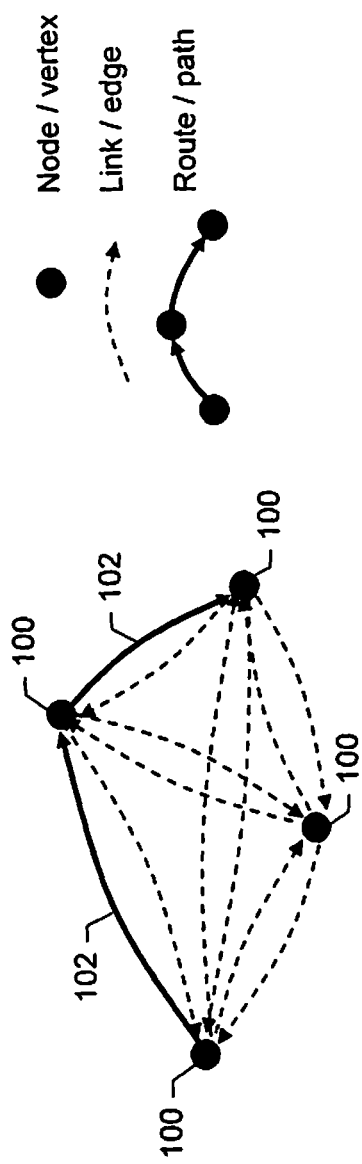
FIG. 2 illustrates a directed graph representation of a multi-hop mesh network.

FIG. 2 illustrates a directed graph representation of a multi-hop mesh network. Referring to FIG. 2, each network node 100 is represented by a graph vertex, and each (potential) wireless link (hop) 102 in the network is represented by a graph edge. A route from a source node (e.g. aggregation point of the backhaul network) to a destination node (e.g. a UE or a distant access node) can then be represented by a path in the graph (i.e. an alternating sequence of vertices and edges).

Figure 1:
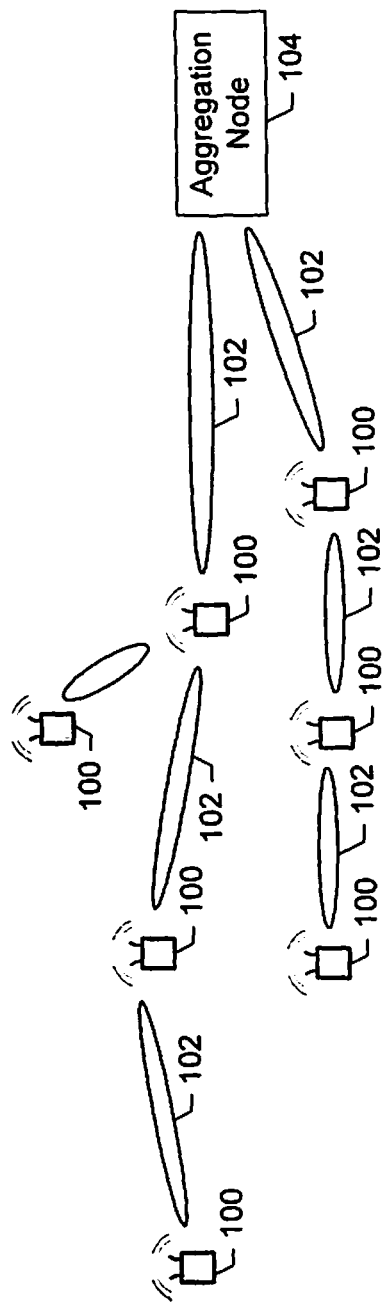
FIG. 1 illustrates a multi-hop mesh network in which a group of self-backhauling access nodes cooperatively route each other's traffic to and from an aggregation node.

In a more advanced representation, each (potential) wireless link can instead be represented by multiple edges, one for each slot of the link, and each node can be represented by multiple vertices, referred to as virtual nodes. An example for the case of a two-node network with two slots is shown in FIG. 3. FIG. 1 illustrates a graph representation that also reflects the slot structure, for the case of two nodes with a single-direction link consisting of two slots. Each real node is here represented by four vertices (virtual nodes). The virtual nodes are used to efficiently model intra-route interference, the details of which will not be further covered here as they are known in the art. A path from a source to a destination node in this graph representation can represent a route that uses exactly one slot in each wireless link (node-node hop) it passes through, whereby a route is referred to as a single-slot route or slot route for short.

For convenience, terms relating to the real network (e.g. node and link) and corresponding terms relating to the graph representation (e.g. vertex and edge) will be used interchangeably.

Operations for routing traffic in a multi-hop mesh network can begin with defining a metric, and then searching for the route(s) that maximizes (or minimizes) that metric. The metric can be defined by a function that assigns (associates) a real number to each possible route (path in the graph). The metric can represent, but is not limited to, the bit rate capacity of the route (e.g., bits per second), the route power consumption (e.g., watts), and/or other parameters that are associated with a route depending upon the optimization target for the routing decision. In general, finding the optimal route is an NP-hard problem, but if the metric fulfills certain requirements (known as monotonicity and isotonicity), the optimal single-slot route can be efficiently found, e.g. using the Bellman-Ford algorithm or Dijkstra algorithm that are known in the art.

Routing can either be centralized (i.e. one central node performs the routing decision) or distributed (i.e. nodes may locally perform routing decisions). Although various embodiments herein are explained in the context of centralized routing, these and other embodiments are not limited thereto and may be used with distributed routing or other forms of routing.

Centralized routing can include three steps: (i) collecting relevant metric information about the quality of potential links and/or paths, (ii) selecting a path based on the collected information, and (iii) communicating information about the selected path to the relevant nodes. Step (ii) is the primary focus of the explanation below.

One approach to routing in a slotted network is to formulate the routing problem as a network flow problem, where the net flow to and from each node should satisfy certain boundary conditions. For example, for a node that is neither a source node nor a destination node, the net flow should be zero, whereas for a destination node, the net flow should equal (the negative of) the bit rate to that destination. For some metrics, such a problem can be solved efficiently using linear programming. The network flow approach can be combined with interference mitigation and optional restrictions on the number of radios per node. As another example, the network flow approach can be used with a metric based on what is referred to as balancing of channel utilization, which leads to a problem formulation that is solvable in polynomial time. In the general case, a network flow formulation leads to a routing solution where traffic to a given destination flows via multiple routes, each of which may traverse a different set of real nodes.

Another approach is to connect each source-destination pair using only a single-slot route. With this approach, standard efficient routing algorithms such as Bellman-Ford or Dijkstra algorithms can often be used. For example, a known heuristic approximate optimization method for the above-mentioned metric can be performed based on load balancing. After approximating the original metric with a simpler metric, the optimal single-slot route (under the simpler metric) can be found by applying the Bellman-Ford algorithm on the graph representation with virtual nodes.

Potential Problems with Approaches Described Above in the Background and the Detailed Description:

Routing based on a network flow formulation has the disadvantage that, as mentioned above, traffic flow to a given destination typically flows over multiple routes traversing different set of nodes. Such multi-path routing is for several reasons impractical in a real network. For example, it introduces high routing complexity and can lead to out-of-order delivery of TCP traffic. Also, the burden of communicating routing information to all concerned nodes is increased.

These problems are avoided by techniques using single-slot routing. However, single-slot routing can also have disadvantages. If the number of slots (per link) in the system, M, is large, the method potentially leads to severe under-utilization of the network capacity, as only 1/M of the theoretical capacity is likely to be used in many links. On the other hand, if M is small, the method may limit simultaneous routing to multiple destinations, since at most M routes can share a link between two nearby nodes, i.e. if there is a bottleneck link through which all routes must go, at most M routes can co-exist. Also, the method may with small M lead to problems with too large interference, since each node must use a rather large fraction of the frequency band/frame time to communicate with nearby nodes.

Presently Disclosed Embodiments Providing Routing Improvements

Some presently disclosed embodiments provide approaches that seek to overcome one or more of these problems by first determining for each pair of a source node and a destination node, a single-slot route connecting the source and destination nodes. The single-slot route may be determined using a standard routing algorithm such as Bellman-Ford or Dijkstra algorithms.

In one embodiment, a first one of the single-slot routes between one of the pairs of source and destination nodes is incrementally grown, extending it to a multi-slot route, by re-running the (standard) routing algorithm on a trimmed augmented graph representation of the network. The trimmed augmented graph representation is based on an advanced graph representation (reflecting slots using multiple edges per potential wireless link) and is obtained by (i) removing all vertices (virtual nodes) except those belonging to real (physical) nodes through which the corresponding original route passes and (ii) removing all edges used by any of the existing routes (with any source or destination). With such trimming, the subsequently chosen route will necessarily go through the same real nodes as the corresponding original route. The process can then be repeated until no more feasible slot routes can be found (each time restoring the original graph before trimming it again), or until another defined rule is satisfied. The growth procedure is then repeated for each of the other single-slot routes between the other pairs of source and destination nodes.

In an alternative embodiment, instead of completing the growth procedure for one of the single-slot routes between one pair of the source and destination nodes, the growth procedure can instead iterate back and forth between the different original slot routes between different pairs of the source and destination nodes, adding only one additional slot route at a time to each pair of the source and destination nodes before adding a further additional slot route. This round-robin iterative growth procedures can result in fairer allocation of resources and services to the different pairs of source and destination nodes, and the users associated therewith.

All the slot routes to a given destination node can be constrained by the routing process to going via the same nodes, which can be desirable by reducing routing complexity relative to multi-path routing and avoiding out-of-order delivery of TCP traffic which can be otherwise result from multi-path routing.

Also, because multiple slots in each link may be used for traffic to a given destination, link capacity of the nodes along the route can be more efficiently and fully utilized. The process can be computationally efficient because it can use standard routing algorithms for finding the individual slot routes.

These and related embodiments of routing processes are described below.

Notation and Terminology Relevant to Embodiments Herein

Further explanation of various terminology and notation is provided in this section before the related embodiments are explained in further detail below.

As discussed above, there are several different types of graph representations of a slotted mesh network. The simple representation is explained below in a more formal mathematical language representation. The formalized simple representation is referred to herein as the basic representation, and the advanced representations are referred to herein as augmented representations.

In the basic representation, the network is represented by a directed graph $G \equiv (V,E)$, where V denotes the set of graph vertices, and E denotes the set of edges, each connecting two vertices in V. Each network node is here represented by a vertex $v \in V$, and each (potential) wireless link (hop) between two distinct nodes is represented by an edge $e \in E$. An edge e can be represented by an ordered pair $e=(v,v')$ where v is the source node and v' is the destination node. Here it is implicitly assumed that there is no self loop in E, i.e. $v \neq v'$ for any edge $e=(v, v') \in E$. The basic representation essentially captures the topological structure characterized by the inter-node connectivity within the network. A route from a source node (e.g. aggregation point of the backhaul network) to a destination node (e.g. a UE or a distant access node) can be represented by a path P in the network, which is an alternating sequence of vertices and edges $v_1, (v_1,v_2), v_2, (v_2,v_3), v_3, \ldots, v_i, (v_i,v_{i+1}), v_{i+1}, \ldots, v_K$, where $v_i \in V$ for all $i=1, 2, \ldots, K$ and $(v_i, v_{i+1}) \in E$ for all $i=1, 2, \ldots, K-1$, and where $K-1$ is the number of edges on the path P, $v_1$ is the start vertex, and $v_K$ is the end vertex. For any given path P, define $V(P)$ as the set of all vertices $\{v_i\}_{i=1}^{K}$ on the path P, and define $E(P)$ as the set of all edges $\{(v_i, v_{i+1})\}_{i=1}^{K-1}$ on the path P. A basic graph representation is illustrated in FIG. 2.

In the augmented graph representations, the network is again represented by a directed graph $\tilde{G} \equiv (\tilde{V}, \tilde{E})$, with $\tilde{V}$ and $\tilde{E}$ being the sets of vertices and edges, respectively. (For clarity, quantities related to an augmented graph are generally labeled with a tilde sign.) However, as opposed to the basic representation, each real node may correspond to more than one graph vertex, i.e. one vertex $v_k \in V$ in the basic representation may correspond to several vertices $\tilde{v}_{k,i} \in \tilde{V}$, $i=1, 2, \ldots I_k$ in the augmented representation, where $I_k$ denotes the number of vertices in the augmented graph belonging to the vertex $v_k \in V$ in the basic graph. Also, each (potential) wireless link may correspond to more than one edge in the augmented graph; for example, each slot of each wireless link may be represented by one edge in the augmented graph.

More formally, in some embodiments, given a basic graph $G \equiv (V, E)$, an augmented graph $\tilde{G} \equiv (\tilde{V}, \tilde{E})$ of $G$ may satisfy:
1) there exists an onto mapping $f_V : \tilde{V} \to V$ such that $f_V(\tilde{v}) = v$ for any $\tilde{v} \in \tilde{V}$ that corresponds to the real node $v \in V$; and
2) there exists an onto mapping $f_E : \tilde{E}_D \to E$ such that $f_E(\tilde{e}) = e$ for any $\tilde{e} \in \tilde{E}_D$ that corresponds to the real edge $e \in E$, where $\tilde{E}_D$ is the subset of $\tilde{E}$ that contains all edges $(\tilde{v}, \tilde{v}') \in \tilde{E}$ such that $f_V(\tilde{v}) \neq f_V(\tilde{v}')$ (i.e. the corresponding real nodes of any edges in $\tilde{E}_D$ are different), and where an edge $\tilde{e} = (\tilde{v}, \tilde{v}') \in \tilde{E}$ is said to correspond to an edge $e = (v, v') \in E$ if and only if $f_V(\tilde{v}) = v$ and $f_V(\tilde{v}') = v'$.

It is seen therefrom that any basic graph $G \equiv (V, E)$ can also be an augmented graph of itself.

Further, in some embodiments, for any set of vertices $V'$ in the basic graph representation, $f_V^{-1}(V') \equiv \{\tilde{v} \in \tilde{V} : f_V(\tilde{v}) \in V'\}$ is defined to be the corresponding set of vertices in the augmented representation, i.e. $\tilde{v}_{k,j} \in f_V^{-1}(V')$ if and only if $v_k = f_V(\tilde{v}_{k,j}) \in V'$. For any set of vertices $\tilde{V}'$ in the augmented graph representation, $f_V(\tilde{V}') \equiv \{f_V(\tilde{v}) : \tilde{v} \in \tilde{V}'\}$ is also defined to be the corresponding set of vertices in the basic graph representation, i.e. $v_k \in f_V(\tilde{V}')$ if and only if $v_k = f_V(\tilde{v}_{k,j})$ for some $\tilde{v}_{k,j} \in \tilde{V}'$. Finally, in analogy with the basic graph, for any given path $\tilde{P}$, let $\tilde{E}(\tilde{P})$ denote its edges and $\tilde{V}(\tilde{P})$ its vertices.

There are many possible variants of augmented graph representations satisfying these requirements; the exact choice may be guided by the problem at hand, e.g. depending on network type and what routing metric and routing algorithm is being used. A number of examples are illustrated by the basic representation and the four (a)-(d) augmented representations in FIG. 4. The basic graph representation and the four (a)-(d) different augmented representations are illustrated for the case of two nodes of a network with a link from one node to the other. Note that in representation (a) of FIG. 4, there are multiple edges connecting the two nodes, meaning that the graph is a multigraph. The augmented representation (d) of FIG. 4 can efficiently handle intra-route interference. The present general description of notation and terminology can apply to most types of augmented representations and is not limited to the particular embodiments disclosed herein, except where otherwise indicated.

The vertices in the augmented graph are referred to herein as virtual nodes. Nodes that are not virtual are sometimes referred to herein as real nodes to avoid ambiguity with virtual nodes. Edges that correspond to edges in the basic graph representation (i.e. edges that connect virtual nodes belonging to different real nodes and do not just represent a connection between virtual nodes inside a real node) will additionally be referred to herein as slot links.

As before, a single-slot route, or slot route for short, denotes a route that uses exactly one slot in each of its links (hops) between nodes along the route through the mesh network. A slot route can thus be represented by a path $\tilde{P}$ through the augmented network.

If a real node contains several virtual nodes, it will often be convenient to reserve one of them as being the virtual destination node, i.e. the virtual nodes to which flows to the real node in question should go. Similarly, one virtual node will often be reserved to be the virtual source node.

Example Route Determination System

Figure 5:
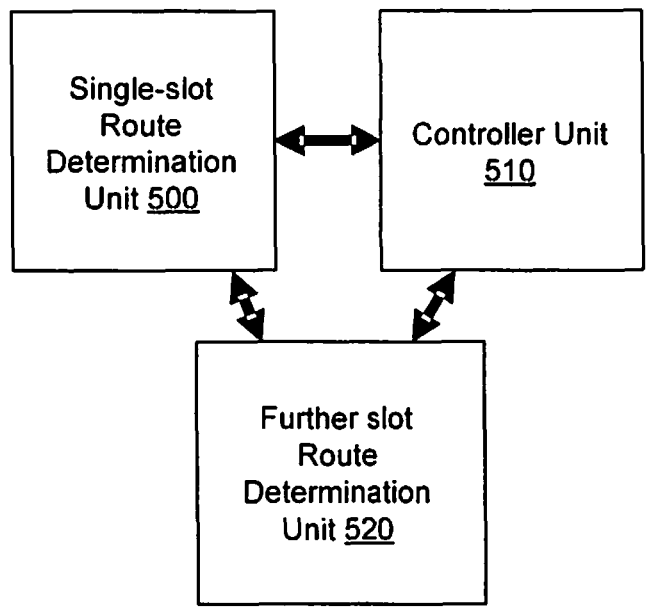
FIG. 5 illustrates a route determination system according to some embodiments.

A route determination system that is configured to operate according to some embodiments is illustrated in FIG. 5. Referring to FIG. 5, the system includes a single-slot route determination unit 500, a controller unit 510, and a further slot route determination unit 520. The functionality described below for routing communications between pairs of source and destination nodes through a mesh network of nodes of a wireless communication system can be performed by these units 500-520, and may be located within a same network node or may be distributed across more than one network node.

Figure 6:
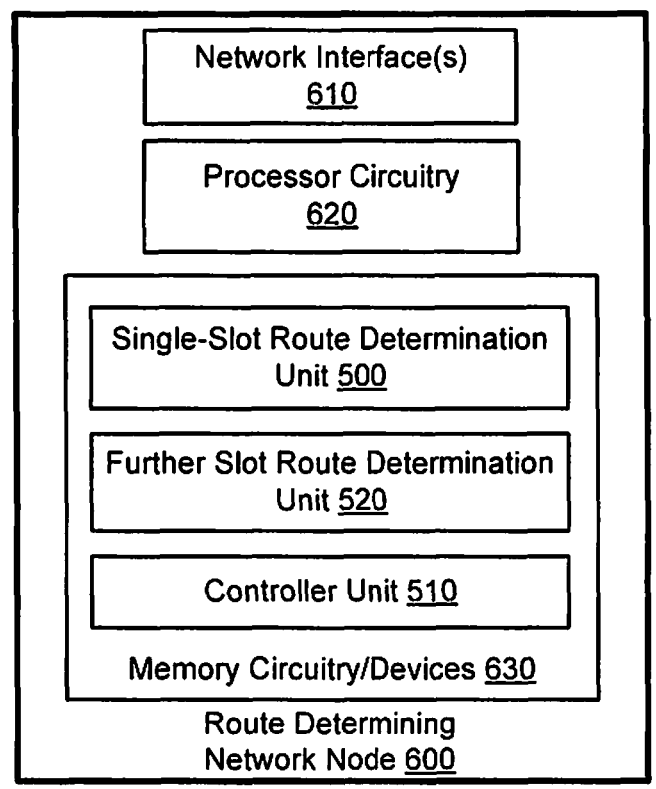
FIG. 6 illustrates a route determining network node according to some embodiments.

FIG. 6 illustrates a route determining network node 600 according to some embodiments. Referring to FIG. 6, the route determining network node 600 can include one or more network interfaces 610, processor circuitry 620, and memory devices 630 that contain functional modules that can include the single-slot route determination unit 500, the controller unit 510, and the further slot route determination unit 520.

The processor circuitry 620 may include one or more data processing circuits, such as a general purpose and/or special purpose processor (e.g., microprocessor and/or digital signal processor) that may be collocated or distributed across one or more networks. The processor circuitry 620 is configured to execute computer program instructions from the functional modules in the memory devices 630, described below as a computer readable medium, to perform some or all of the operations and methods that are described herein for one or more of the embodiments, such as the embodiments of FIGS. 7-23 described below. Accordingly, the processor circuitry 620 can be configured by execution of the computer program instructions in the functional modules to carry out at least some of the functionality described herein for routing communications between pairs of source and destination nodes through a mesh network of nodes of a wireless communication system.

The route determining network node 600 may be incorporated within, or separate but communicatively connected to, any radio access node to control the radio access node to operate according to one or more embodiments herein. The radio access node may include, but is not limited to, a wireless local area network (WLAN) transceiver access node, a worldwide interoperatbility for microwave access (WiMAX) transceiver access node, and/or a cellular transceiver base station.

Figure 10:
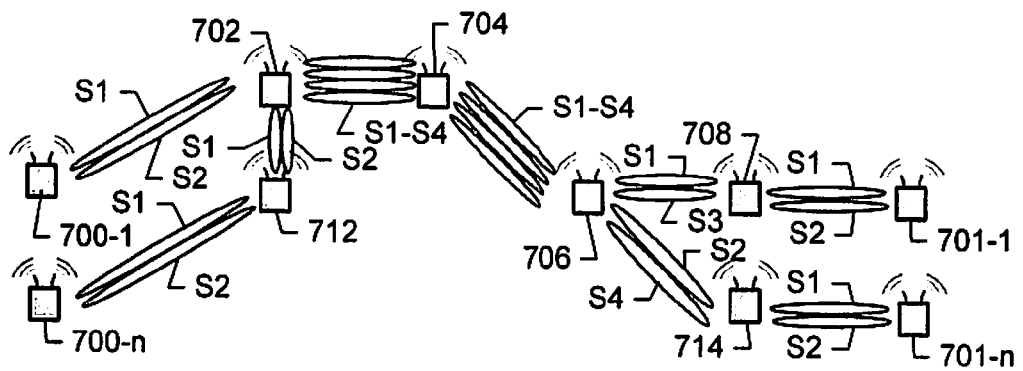
FIG. 10 illustrates example trimming of some nodes and assigning another slot to the same sequence of network nodes along the two routes according to some embodiments.
Figure 11:
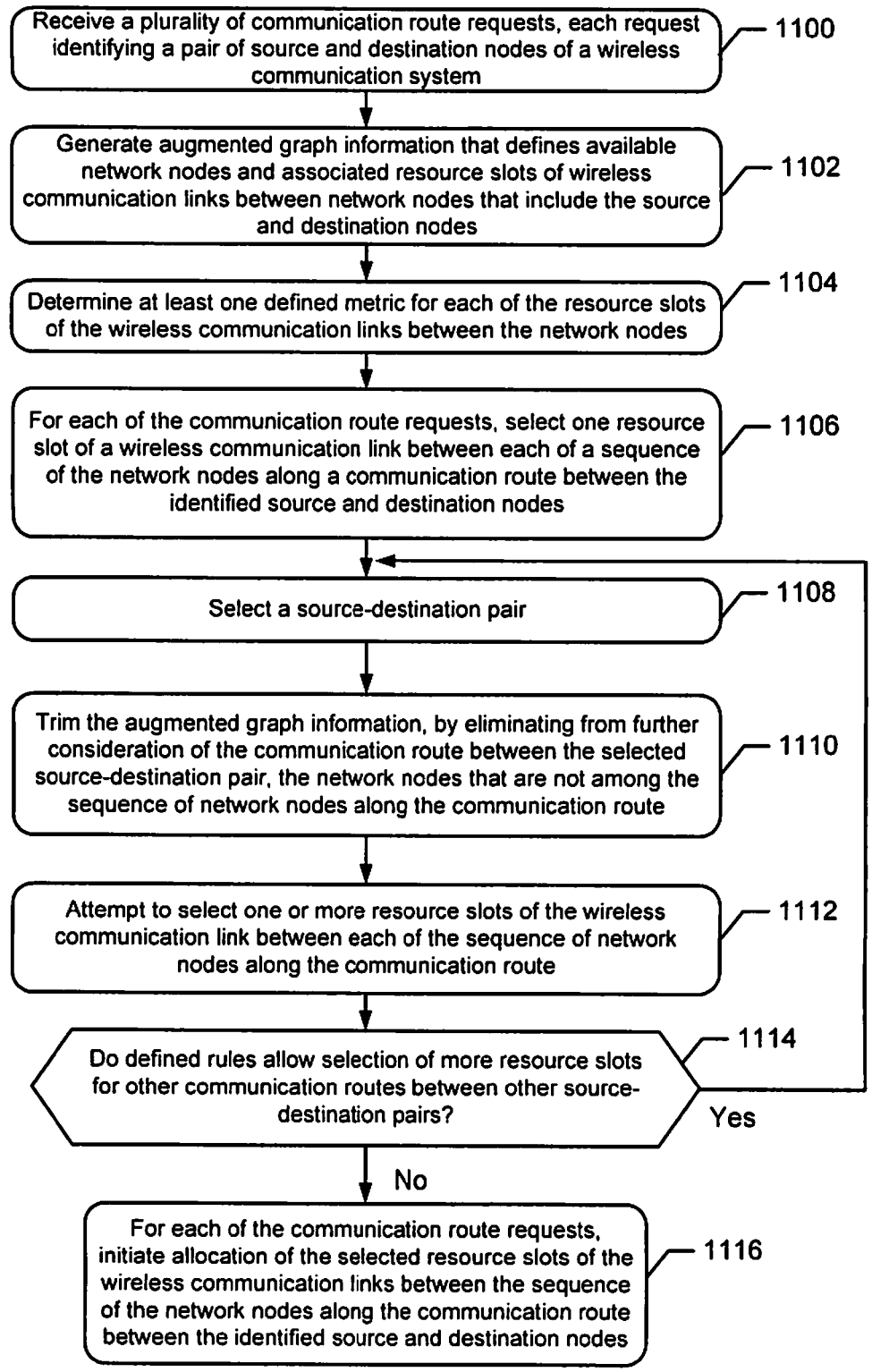
FIG. 11 illustrates a flowchart of operations and methods that provide route determination through a mesh of network nodes according to some embodiments.

Example Operations and Methods Providing Routing Through a Mesh Network of Nodes Example operations and methods for providing routing through a mesh of network node are explained below with regard to FIGS. 7-11. FIG. 11 illustrates a flowchart of operations and methods that provide route determination through a mesh of network nodes according to some embodiments. The operations of FIG. 11 may, for example, be performed by the system of FIG. 5 and/or the route determination network node 600 of FIG. 6.

For the illustrates steps of FIG. 11, it is assumed that there is a set of source nodes $v_n^{(s)}$, n=1, 2, . . . , $N_c$, which are to be connected pair-wise with a set of destination nodes $v_n^{(d)}$, n=1, 2, . . . , $N_c$, i.e. for each n, $v_n^{(s)}$ should be connected with $v_n^{(d)}$ via some route, where $N_c$ denotes the number of source-destination pairs. Each source node $v_n^{(s)}$ is assumed to contain one virtual source node, denoted $\tilde{v}_{n,1}^{(s)}$, and each destination node is assumed to contain one virtual destination node, denoted $\tilde{v}_{n,1}^{(d)}$ in the augmented graph. The source and destination nodes need not all be distinct (e.g. it may be that $\tilde{v}_{n',j'}^{(s)} \equiv \tilde{v}_{n'',j''}^{(s)}$ for some n'≠n" and/or j'≠j"). Hence, the objective is to find, for each node pair ($\tilde{v}_{n,1}^{(s)}$, $\tilde{v}_{n,1}^{(d)}$), a set of slot routes $\tilde{P}_{n,j}$ connecting the pair, where j=1, 2, . . . , $J_n$ is an index enumerating all slot routes from $\tilde{v}_{n,1}^{(s)}$ to $\tilde{v}_{n,1}^{(d)}$. (The value of $J_n$ is thus typically not known before the entire routing procedure has been completed.) The step-by-step procedure is then as follows:

Referring to FIG. 11, in step 1100, a plurality of communication route requests are received from a plurality of source nodes. Augmented graph information is generated (step 1102), e.g., by the controller unit 510, that defines available network nodes and associated resource slots of wireless communication links between network nodes that include the source and destination nodes. At least one defined metric (e.g., bit rate capacity, power consumption, and/or other defined metric parameters of the resource slots of the wireless communication links) is determined (step 1104), e.g., by the controller unit 510, for each of the resource slots of the wireless communication links between the network nodes.

For each of the communication route requests, one resource slot of a wireless communication link is selected (step 1106), e.g., by the single-slot route determination unit 500, between each of a sequence of the network nodes along a communication route between the identified source and destination nodes. The single-slot route determination may be performed using the Bellman-Ford algorithm or the Dijkstra algorithm which are known in the art. In the augmented graph representation, one slot route $\tilde{P}_{m,1}$ is established for each virtual source-destination node pair ($\tilde{v}_{m,1}^{(s)}$, $\tilde{v}_{m,1}^{(d)}$), m=1, 2, . . . , $N_c$.

In step 1108, one source-destination virtual node pair, say the nth one (i.e. ($\tilde{v}_{n,1}^{(s)}$, $\tilde{v}_{n,1}^{(d)}$), then selected for expansion to a multi-slot route therebetween, e.g., by the further slot route determination unit 520.

In step 1110, the augmented graph representation of the network is trimmed, e.g., by the further slot route determination unit 520, by eliminating from further consideration of the communicate route between the selected source-destination virtual node pair, network nodes that are not among the sequence of network nodes that were earlier selected along the communication route between the selected source-destination virtual node pair. More particularly, the augmented graph representation of the network may be trimmed by removing all vertices (virtual nodes) except those that correspond to a real node (basic graph vertex) that $\tilde{P}_{n,1}$ passes through (i.e. a vertex $\tilde{v}$ is removed if and only if $\tilde{v} \notin f_V^{-1}(f_V(\tilde{V}(\tilde{P}_{n,1})))$), and removing all edges that any previously established slot route passes through (i.e. an edge $\tilde{e}$ is removed if and only if $\tilde{e} \in \tilde{E}(\tilde{P}_{n',j})$ for any $\tilde{P}_{n',j}$, n'=1, 2, . . . , $N_c$, j=1, 2, . . . , $j_{latest,n'}$, where $j_{latest,n'}$ is the index of the latest established route for source-destination pair)). This trimming procedure can be modified when the augmented graph is a multi-graph, as explained below regarding some alternative approaches according to other embodiments.

In step 1112, for each of the network nodes that were part of the original route between the selected source-destination virtual node pair, the routing process attempts to select another resource slot of the wireless communication link between those nodes along that route. In the augmented graph representation, one new slot route is searched between $\tilde{v}_{n,1}^{(s)}$ and $\tilde{v}_{n,1}^{(d)}$ by performing routing in the trimmed network. A new slot route $\tilde{P}_{n,(j_{latest,n}+1)}$ is established if it can be found. An existing routing algorithm such as Bellman-Ford algorithm may be used to search for and select the new slot route. The process of step 1112 may be repeated to select more resource slots between the nodes along that route until one or more defined rules are satisfied (e.g., rule defining a resource allocation limit for a route).

The one or more routing metric(s) that is used for selection of additional slots for the expanded slot route may remain static (e.g., constant value(s)) during the expansion of the route to multi-slots. However, in some other embodiments, the one or more routing metric(s) may change in response to information about any previously established slot routes (i.e. even slot routes not being part of the trimmed network). For example, one or more routing metric(s) may be modified to compensate for estimates of intra-route interference cause by the earlier established slot routes in the routing process. The routing metric for at least one of the resource slots of one of the network nodes may be modified, for example, responsive to a level of communication interference that will be created by an earlier selection of another one of the resource slots of the one of the network nodes. In one embodiment, a communication rate indicated by a routing metric for one or more resource slots of a network node, can be decreased by an amount determined from the level of communication interference that will be created by an earlier selection of another one of the resource slots of the network node, an adjacent network node, and/or another proximately located network node.

In step 1114, a determination is made as to whether one or more defined rules allow expansion of the number of resource slots allocated to the same or other communication routes between the same or other source-destination node pairs. Such further expansion may be allowed when one or more other source-destination node pairs (e.g., users thereof) could benefit from higher communication bit rates and it is possible to find more slot routes through the nodes along the route between the respective source-destination node pairs (e.g. determined by keeping a memory of whether any previous attempt to find a route to a particular node in question has failed). When expansion of slot routes is allowed, the operations and methods of steps 1108-114 are repeated for the same or another source-destination node pair. When repeating from step 1108, the source-destination pair n selected may either be the same as selected last time step 1108 was executed, or it may be a different source-destination node pair.

As explained above, expansion of the slots assigned to a route between one of the source-destination node pairs may be completed before more slots are assigned to another single-slot route between another one source-destination node pairs, so that route expansion is performed sequentially through a list of the source-destination node pairs. Alternatively, expansion of the slots assigned to the routes between the source-destination node pairs may be iteratively performed by, for example, adding one additional slot route at a time to each of the source-destination node pairs before repeating the processing adding another additional slot route to at least some of the source-destination node pairs. The iterative process may maintain the same order for determination of an additional slot for the source-destination node pairs from one slot expansion cycle to the next, or the order for determination of the source-destination node pairs for determination of slot expansion may be varied between cycles (e.g., randomized between cycles, determined based on priorities which can change between cycles, etc.).

In step 1116, for each of the communication route requests, resource allocation is initiated for the selected resource slots of the wireless communication links between the sequence of the network nodes along the communication route between each of the identified pairs of source and destination nodes. The allocation of resources can include communicating the resource allocations (e.g., slot route assignments) from the controller unit 510 (e.g., via the network interface 610) to the respective network nodes along the sequence of each route between the pairs of source-destination nodes. Communication of the resource allocations may occur using node forwarding through the wireless links between the network nodes (e.g., self-backhauling) and/or it may occur through separate wireless or wired communication links to the network nodes.

Figure 7:
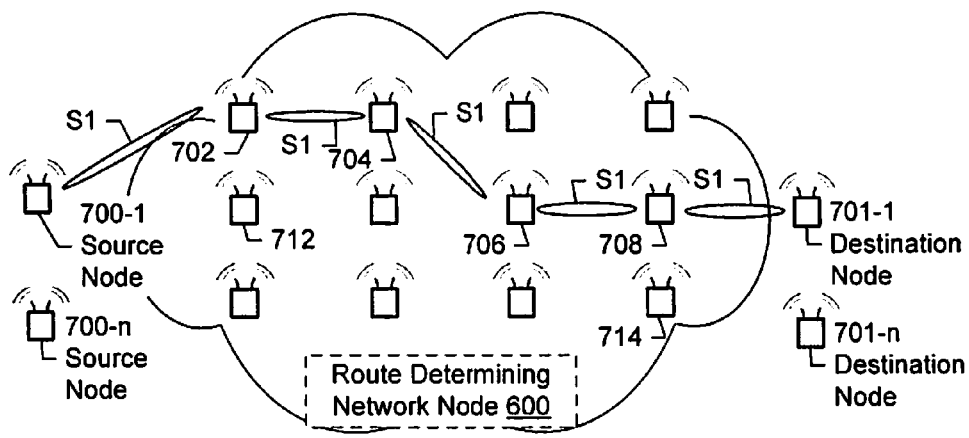
FIG. 7 illustrates a single-slot route between a source node and a destination node according to some embodiments.
Figure 8:
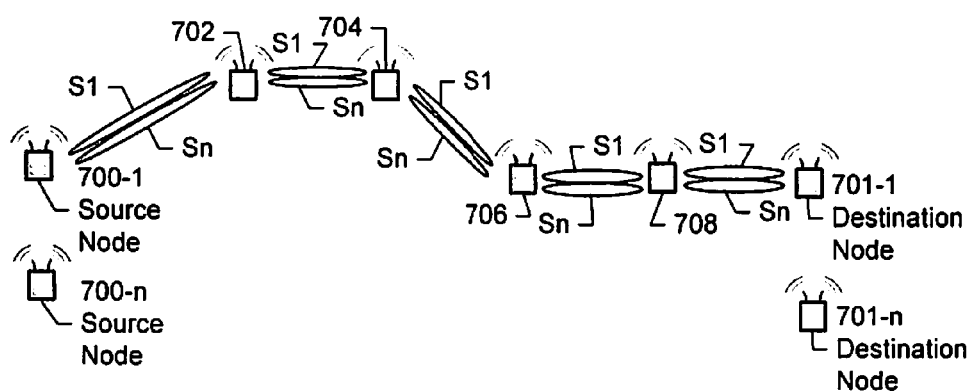
FIG. 8 illustrates an n-th slot route between the source and destination nodes via the same intervening nodes as for the single-slot route according to some embodiments.

FIGS. 7-10 are now referenced for their illustration of various aspects of the route determination processes that are performed by, for example, the route determination network node 600. FIG. 7 illustrates a single-slot route S1 that has been established between a source node 700-1 and a destination node 701-1 through a plurality of network nodes 702-708 according to some embodiments. FIG. 8 illustrates an n-th slot route Sn that has been established between the source node 700-1 and the destination node 701-1 via the same intervening nodes 702-708 as for the single-slot route according to some embodiments. In the embodiment of FIGS. 7 and 8, it is assumed that the source node 700-1 and the destination node 701-1 are the only source-destination node that need slot assignment at the instant of time, or alternatively it is assumed that the routing process operates to complete the slot assignment to the source-destination node pair 700-1,701-1 before forming a multi-slot route between another source-destination node pair 700-n,701-n.

Figure 9:
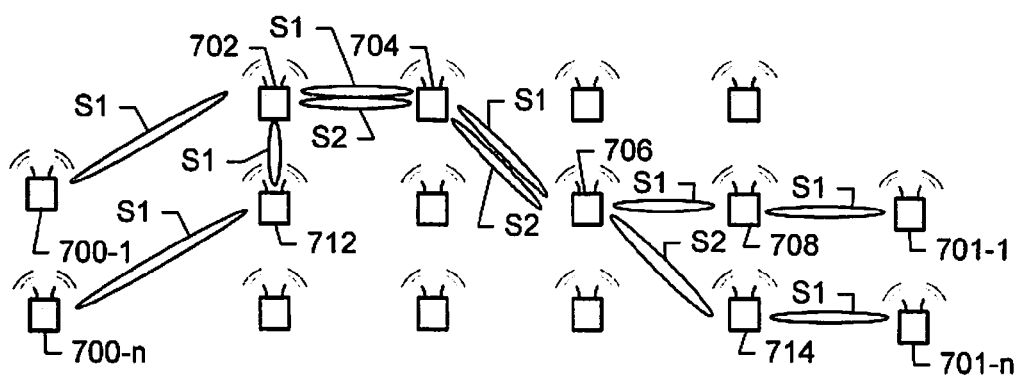
FIG. 9 illustrates two single-slot routes between two pairs of source and destination nodes are illustrated according to some embodiments.

FIG. 9 illustrates a first single slot route S1 that has been established between a first pair of source-destination nodes 700-1, 701-1, and a second single slot route S2 that has been established between a second pair of source-destination nodes 700-1,701-n according to some embodiments. In the embodiment of FIG. 9, some network nodes 702, 704, and 706 are shared by the first and second single slot routes S1,S2 (i.e., resource slots of those nodes support both routes S1,S2). FIG. 10 illustrates example trimming of some network nodes in the mesh network and assigning another slot to the same sequence of network nodes 702-708 along the two routes S1,S2 according to some embodiments.

Alternative Approaches of Related Embodiments

Other related embodiments, including extensions, alternatives, or modification of one or more of the above embodiments are explained below.

One or more of the metrics associated with a network node or slots of a network node may be updated after each addition of a new slot route. For example, the one or more metrics may be updated to provide interference mitigation and/or other restrictions on the number of slots that can be simultaneously utilized per node. Alternatively or additionally, the one or more metrics may be updated to provide balancing of channel utilization.

Step 1110 of FIG. 11 may be modified to omit the trimming of edges through which previously established slot routes $\tilde{P}_{n',j}$, n'=1, 2, ..., $N_c$, j=1, 2, ..., $j_{latest,n'}$, pass, and allow the new route to go through those edges (slot links) if all capacity of the slot link is not used yet (e.g. because there was a bottleneck in another place for the previously established node). In particular, it may be advantageous to omit trimming of edges used by previously established routes for the same source-destination pair ($\tilde{v}_{n,1}^{(s)}, \tilde{v}_{n,1}^{(d)}$).

Step 1112 of FIG. 11 may be modified by associating a transmission power with each slot link established as part of the slot route. This may be advantageous when the full capacity of all slot links of the new slot route are not needed (e.g. because there is a bottleneck in the slot route that anyway limits its capacity), in which case the non-bottleneck slot links may be assigned a reduced transmission power, thereby spreading less interference to the rest of the network.

Step 1112 of FIG. 11 may be modified to establish new slot routes (i.e. slot routes for which j>1) not always from source to destination ($\tilde{v}_{n,1}^{(s)}$ to $\tilde{v}_{n,1}^{(d)}$), but rather between any pair of virtual nodes selected from the set of virtual nodes that belong to any of the real nodes through which the original slot route passes. This may be advantageous for metrics like bit rate metrics, where one or a few links (hops) may constitute a bottleneck for the capacity, meaning that only those links need to be bridged by additional slot links.

Another step may be added between steps 1112 and 1114 of FIG. 11, which removes one or more slot links from the latest established slot route. This step could serve the same or similar purpose as the partial-route method in the previous bullet (the difference being that when using step 204b, the full slot route is first established before the unnecessary slot links are removed).

Step 1110 of FIG. 11 may be modified so that the first trimming sub-step removes all edges except those whose (virtual) source and destination nodes both belong to a real node through which $P_{n,1}$ passes (i.e. remove an edge $\tilde{e}=(\tilde{v},\tilde{v}')$ if and only if $\tilde{v} \notin f_V^{-1}(f_V(\tilde{V}(\tilde{P}_{n,1})))$ or $\tilde{v}' \notin f_V^{-1}(f_V(\tilde{V}(\tilde{P}_{n,1})))$). Optionally, this modification may be combined with the previously described step 1110 of FIG. 11. The edge trimming may be advantageous when the augmented graph is a multi-graph.

Step 1110 of FIG. 11 may be modified by replacing the trimming step in the second sub-step with the following trimming step: Remove all vertices (virtual nodes) that any already established slot route passes through, except that the nodes $\tilde{v}_{n,1}^{(s)}$ and $\tilde{v}_{n,1}^{(d)}$ should not be removed (i.e. a vertex $\tilde{v}$ is removed if and only if $\tilde{v} \in \tilde{V}(\tilde{P}_{n',1}) \setminus \{\tilde{v}_{n,1}^{(s)}, \tilde{v}_{n,1}^{(d)}\}$ for any $\tilde{P}_{n',j}$, n'=1, 2, ..., $N_c$, j=1, 2, ..., $j_{latest,n'}$, where $j_{latest,n'}$ is again the index of the latest established route for source-destination pair ($\tilde{v}_{n,1}^{(s)}, \tilde{v}_{n',1}^{(d)}$), and \ denotes set difference. Optionally, this modification may be combined with the previously described vertex trimming of step 1110 of FIG. 11.

As explained above, expansion of the number of slots assigned to individual ones of the routes may occur through a round-robin or other alternating order between the source-destination pairs. In one embodiment, the order is, after having established the initial slot route for each source-destination pair, to proceed by establishing all possible further slot routes for one of the source-destination pairs before continuing with the next source-destination pair. In another embodiment, after having established the initial slot route for each source-destination pair, the order proceeds by establishing one additional slot route to each source-destination pair before continuing with a third slot route for any source-destination pair, and so forth. Yet another embodiment adds multiple slot routes to one source-destination pair before having established all initial slot routes.

There may be multiple virtual source nodes and/or virtual destination nodes in one real node. This may be a useful representation e.g. if there are several simultaneous packet flows to one real node.

The trimming may be implicit, i.e. the route determining node 600 does not necessarily have to store a copy of the trimmed network representation, but could rather be aware of the rules governing the trimming and use them to determine during routing which nodes and edges are eligible for use.

To further increase bit rates and/or fairness, one embodiment re-establishes one or more already established slot routes by first removing them and then searching for new slot routes (for the same source-destination node pair or a different source-destination node pair, depending on, for example, a defined fairness criterion).

Before starting the routing procedure, the slots in the network may be grouped into slot groups, which then play the role of slots in the slot assignment portion of the routing procedure. This may be particularly useful if the number of slots is significantly larger than the number of users (e.g., source-destination node pairs) in the system. Conversely, if the number of users is larger than the number of slots available, an embodiment can split one or more slots into multiple subslots, which then play the role of slots in the slot assignment portion of the routing procedure.

After having established all slot routes for all source-destination pairs, an embodiment can consider all routes belonging to a give source-destination pairs as a single route (for higher layers, e.g. TCP).

Further Operations and Methods of Some Embodiments

FIGS. 12-23 illustrate flowcharts of related operations and methods by a network node, such as the route determining node 600 of FIG. 6, for routing communications between pairs of source and destination nodes through network nodes of a wireless communication system, according to some embodiments.

Figure 12:
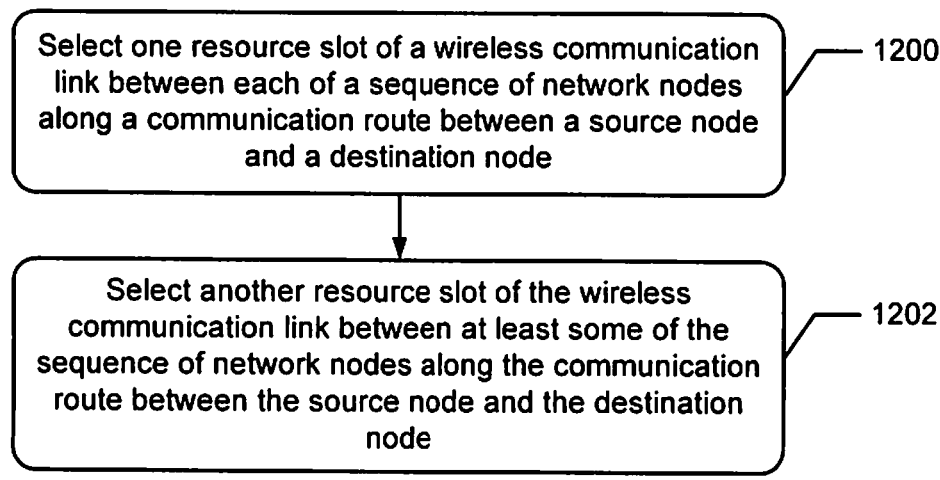
Figure 13:
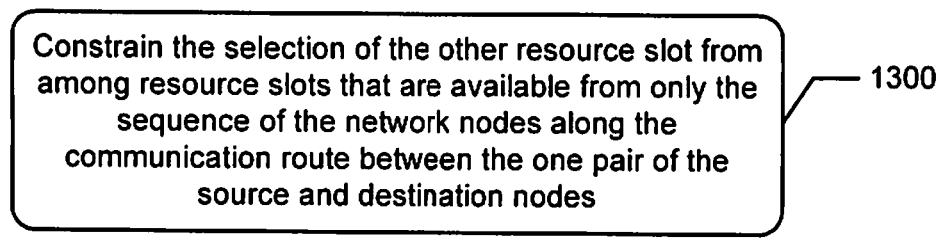
Figure 14:
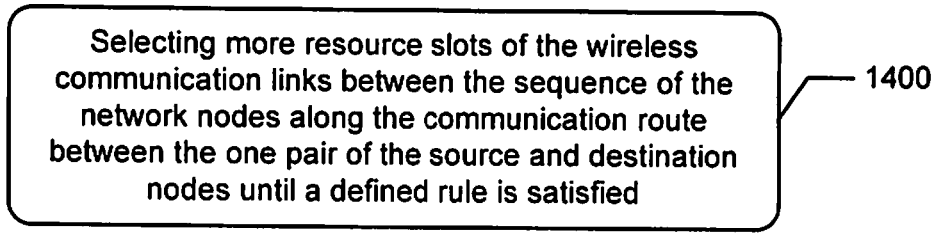

Referring to FIG. 12, the operations and methods includes selecting (step 1200) one resource slot of a wireless communication link between each of a sequence of the network nodes along a communication route between one pair of the source and destination nodes. Another resource slot of the wireless communication link is selected (step 1202) between at least some of the sequence of the network nodes along the communication route between the one pair of the source and destination nodes.

The multi-slot selection can be constrained to the slots available from only the sequence of network nodes of the single-slot route. These further operations and methods are illustrated in the related embodiment of FIG. 13, where the selecting (step 1202 of FIG. 12) another resource slot of the wireless communication link between at least some of the sequence of the network nodes is constrained to selecting (step 1300) among resource slots that are available from only the sequence of the network nodes along the communication route between the one pair of the source and destination nodes.

The resource slots of the wireless communication link between pairs of the network nodes can comprise a frequency slot and/or a time slot that is available to transmit and/or receive traffic.

The selection of more resource slots along the route can be repeated until a defined rule is satisfied (e.g., a desired number of slots is reached, no more slots are available, etc.). These further operations and methods are illustrated in the related embodiment of FIG. 14, which includes selecting (step 1400) more resource slots of the wireless communication links between the sequence of the network nodes along the communication route between the one pair of the source and destination nodes until a defined rule is satisfied.

A resource allocation message can be communicated to the network nodes to trigger setup of the allocated slots to the routes. These further operations and methods are illustrated in the related embodiment of FIG. 15, which includes communicating (step 1500) a resource allocation message to each of the sequence of network nodes along the communication route between the one pair of the source and destination nodes to allocate the respective selected resource slots for communication of traffic in at least one direction between the one pair of the source and destination nodes.

Single-slot route selection can be performed between all source-destination node pairs before performing another-slot route selection between the source-destination node pairs. These further operations and methods are illustrated in the related embodiment of FIG. 16, which includes, for each of the other pairs of source and destination nodes, selecting (step 1600) one resource slot of a wireless communication link between each of a sequence of the network nodes along a communication route between the respective pair of the source and destination nodes. For each of the other pairs of source and destination nodes, another resource slot of the wireless communication link is selected (step 1602) between at least some of the sequence of the network nodes along the communication route between the respective pair of the source and destination nodes.

Multiple-slot selection can be performed for a route between one pair of source and destination nodes before performing multiple-slot selection for a route between another pair of source and destination nodes. These further operations and methods are illustrated in the related embodiment of FIG. 17, which includes, following selection of the other resource slot of the wireless communication link between at least some of the sequence of the network nodes along the communication route between the one pair of the source and destination nodes, selecting (step 1700) one resource slot of a wireless communication link between each of a sequence of the network nodes along a communication route between another pair of the source and destination nodes. Another resource slot of the wireless communication link is selected (step 1702) between at least some of the sequence of the network nodes along the communication route between the another pair of the source and destination nodes.

The resource slots can be selected based on one or more metrics. In the further embodiment of FIG. 18, at least one metric is determined (step 1800) for each of the resources slots of the wireless communication links between the network nodes. The resource slots of the wireless communication links between each of the sequences of the network nodes along the communication routes between the pairs of the source and destination nodes are selected (step 1802) responsive to the at least one metric for each of the resources slots.

Some of the metrics may be modified responsive to previous resource slot selections. In the further embodiment of FIG. 19, the at least one metric is modified (step 1900) for at least one of the resource slots of one of the network nodes responsive to a level of communication interference that will be created by an earlier selection of another one of the resource slots of the one of the network nodes. The modification (step 1900) may include decreasing (1900) a communication rate indicated by the at least one metric, for the at least one of the resource slots of one of the network nodes, by an amount determined from the level of communication interference.

A transmission power level of a slot can be adjusted responsive to communication interference from previous resource slot selections. In the further embodiment of FIG. 20, a planned transmission power level is adjusted (step 2000) for one of the resource slots of one of the network nodes that is being selected responsive to a level of communication interference that will be created by an earlier selection of another one of the resource slots.

In the further embodiment of FIG. 21, a planned transmission power level is adjusted (step 2100) for a particular one of the resource slots of one of the network nodes responsive to an available communication rate of the particular one of the resource slots.

A new network node can be added to a subsequent route to bypass a bottleneck network node. In the further embodiment of FIG. 22, responsive to a communication bottleneck being present in one of the network nodes along one of the communication routes which does not have a threshold available communication rate, at least one resource slot is selected (step 2200) as a substitute other network node to bypass the bottleneck one of the network nodes.

Slots along one route can be reselected responsive to interference that will be created by a slot selected for another route. In the further embodiment of FIG. 23, a replacement resource slot for a previously selected resource slot of one of the network nodes within the sequence of the network nodes along the communication route between the one pair of the source and destination nodes, is selecting (step 2300) in response to a level of communication interference that will be created by a selection of another resource slot of one of the network nodes along another communication route between another respective pair of the source and destination nodes.

At least one of the resource slots that is selected from at least one of the network nodes may be shared by at least two communication routes between at least two different pairs of the source and destination nodes. A plurality of the source nodes can include a corresponding plurality of logical data flows residing in a common physical node, and/or a plurality of the destination nodes can include a corresponding plurality of logical data flows residing in another common physical node.

Potential Advantages Provided by Various Embodiments

Various embodiments disclosed herein may decrease the computational requirements to determine a multi-slot route that makes all the (slot) routes to a given destination node go via the same sequence of (real) nodes. The multi-slot route determination may have reduced routing complexity relative to multi-path routing and avoid out-of-order delivery of TCP traffic which can be otherwise result from multi-path routing. Moreover, because multiple slots in each link may be used for traffic to a given destination, available link capacity can be better utilized for traffic. Furthermore, routes to different destinations can naturally come to share links when appropriate.

ABBREVIATIONS

A list of abbreviations used in the present disclosure is provided below for ease of reference of the reader:
  3GPP Third Generation Partnership Project
  BSS Base Station Subsystem
  CS Circuit Switched
  CSFB Circuit Switched Fall Back
  EDGE Enhanced Data rates for GSM Evolution
  E-UTRAN Evolved Universal Terrestrial Radio Access Network
  eNodeB E-UTRAN NodeB
  FULL-MOCN FULL-Multi-Operator Core Network
  GERAN GSM EDGE Radio Access Network
  GPRS General Packet Radio Service
  IE Information Element
  IMS IP Multimedia Subsystem
  LAU Location Area Update
  MME Mobility Management Entity
  MS Mobile Station
  MSC Mobile Switching Centre
  PLMN Public Land Mobile Network
  PS Packet Switched
  RNC Radio Network Controller
  RNS Radio Network Subsystem
  SGSN Serving GPRS Support Node
  SI System Information
  UMTS Universal Mobile Telecommunications System
  UTRAN UMTS Terrestrial Radio Access Network

FURTHER DEFINITIONS

In the above-description of various embodiments of the present disclosure, it is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of this specification and the relevant art and will not be interpreted in an idealized or overly formal sense expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

A tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/BluRay).

The computer program instructions may also be loaded onto a computer and/or other programmable data processing apparatus to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks. Accordingly, embodiments of the present disclosure may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated. Moreover, although some of the diagrams include arrows on communication paths to show a primary direction of communication, it is to be understood that communication may occur in the opposite direction to the depicted arrows.

Many different embodiments have been disclosed herein, in connection with the above description and the drawings. It will be understood that it would be unduly repetitious and obfuscating to literally describe and illustrate every combination and subcombination of these embodiments. Accordingly, the present specification, including the drawings, shall be construed to constitute a complete written description of various example combinations and subcombinations of embodiments and of the manner and process of making and using them, and shall support claims to any such combination or subcombination.

Many variations and modifications can be made to the embodiments without substantially departing from the principles of the present invention. All such variations and modifications are intended to be included herein within the scope of the present invention.

What is claimed is:

1. A method by a network node for routing communications between pairs of source and destination nodes through network nodes of a wireless communication system, the method comprising:
   selecting one resource slot of a wireless communication link between each of a sequence of the network nodes along a communication route between one pair of the source and destination nodes; and
   selecting another resource slot of the wireless communication link between at least some of the sequence of the network nodes along the communication route between the one pair of the source and destination nodes;
   wherein the method further comprises:
   determining, for each of a plurality of pairs of nodes of the wireless communication system, at least one metric for each resource slot of a wireless communication link between the pair; and
   modifying at least one metric for at least one of the resource slots for at least one of the wireless communication links between the plurality of pairs of nodes, responsive to previous selections of resource slots; and
   wherein said selecting one resource slot and selecting another resource slot are based on the determined and modified metrics.

2. The method of claim 1, wherein the selecting another resource slot of the wireless communication link between at least some of the sequence of the network nodes along the communication route between the one pair of the source and destination nodes is constrained to selecting among resource slots that are available from only the sequence of the network nodes along the communication route between the one pair of the source and destination nodes.

3. The method of claim 1, wherein the resource slots of the wireless communication link between pairs of the network nodes comprise a frequency slot and/or a time slot that is available to transmit and/or receive traffic.

4. The method of claim 1, further comprising selecting more resource slots of the wireless communication links between the sequence of the network nodes along the communication route between the one pair of the source and destination nodes until a defined rule is satisfied.

5. The method of claim 1, further comprising communicating a resource allocation message to each of the sequence of network nodes along the communication route between the one pair of the source and destination nodes to allocate the respective selected resource slots for communication of traffic in at least one direction between the one pair of the source and destination nodes.

6. The method of claim 1, further comprising:
for each of the other pairs of source and destination nodes, selecting one resource slot of a wireless communication link between each of a sequence of the network nodes along a communication route between the respective pair of the source and destination nodes; and
for each of the other pairs of source and destination nodes, selecting another resource slot of the wireless communication link between at least some of the sequence of the network nodes along the communication route between the respective pair of the source and destination nodes.

7. The method of claim 1, the method further comprising, following selection of the other resource slot of the wireless communication link between at least some of the sequence of the network nodes along the communication route between the one pair of the source and destination nodes:
selecting one resource slot of a wireless communication link between each of a sequence of the network nodes along a communication route between another pair of the source and destination nodes; and
selecting another resource slot of the wireless communication link between at least some of the sequence of the network nodes along the communication route between the another pair of the source and destination nodes.

8. The method of claim 1, further comprising modifying the at least one metric for at least one of the resource slots of one of the network nodes responsive to a level of communication interference that will be created by an earlier selection of another one of the resource slots of the one of the network nodes.

9. The method of claim 8, wherein modifying the at least one metric for at least one of the resource slots of one of the network nodes responsive to the level of communication interference, comprises decreasing a communication rate indicated by the at least one metric, for the at least one of the resource slots of one of the network nodes, by an amount determined from the level of communication interference.

10. The method of claim 1, further comprising adjusting a planned transmission power level of one of the resource slots of one of the network nodes that is being selected responsive to a level of communication interference that will be created by an earlier selection of another one of the resource slots.

11. The method of claim 1, further comprising adjusting a planned transmission power level of a particular one of the resource slots of one of the network nodes responsive to an available communication rate of the particular one of the resource slots.

12. The method of claim 1, further comprising responsive to a communication bottleneck being present in one of the network nodes along one of the communication routes which does not have a threshold available communication rate, selecting at least one resource slot of a substitute other network node to bypass the bottleneck one of the network nodes.

13. The method of claim 1, further comprising selecting a replacement resource slot for a previously selected resource slot of one of the network nodes within the sequence of the network nodes along the communication route between the one pair of the source and destination nodes in response to a level of communication interference that will be created by a selection of another resource slot of one of the network nodes along another communication route between another respective pair of the source and destination nodes.

14. The method of claim 1, wherein at least one of the resource slots that is selected from at least one of the network nodes is shared by at least two communication routes between at least two different pairs of the source and destination nodes.

15. The method of claim 1, wherein a plurality of the source nodes comprise a corresponding plurality of logical data flows residing in a common physical node, and/or a plurality of the destination nodes comprise a corresponding plurality of logical data flows residing in another common physical node.

16. A route determining network node for routing communications between pairs of source and destination nodes through network nodes of a wireless communication system, the route determination network node comprising:
processor circuitry and memory, configured to select one resource slot of a wireless communication link between each of a sequence of the network nodes along a communication route between one pair of the source and destination nodes;
wherein the processor circuit and memory are further configured to select another resource slot of the wireless communication link between at least some of the sequence of the network nodes along the communication route between the one pair of the source and destination nodes;
wherein the processor circuit and memory are further configured to:
determine, for each of a plurality of pairs of nodes of the wireless communication system, at least one metric for each resource slot of a wireless communication link between the pair; and
modify at least one metric for at least one of the resource slots for at least one of the wireless communication links between the plurality of pairs of nodes, responsive to previous selections of resource slots; and
wherein the processor circuit and memory are configured to selecting the one resource slot and select the another resource slot based on the determined and modified metrics.

17. The route determining network node of claim 16, wherein the processor circuitry and memory are further configured to control the further slot route determination unit to constrain the selection of the other resource slot from among resource slots that are available from only the sequence of the network nodes along the communication route between the one pair of the source and destination nodes.

18. The route determining network node of claim 16, wherein the processor circuitry and memory are further configured to:
- for each of the other pairs of source and destination nodes, select one resource slot of a wireless communication link between each of a sequence of the network nodes along a communication route between the respective pair of the source and destination nodes; and
- for each of the other pairs of source and destination nodes, select another resource slot of the wireless communication link between at least some of the sequence of the network nodes along the communication route between the respective pair of the source and destination nodes.

19. The route determining network node of claim 16, wherein the processor circuitry and memory are further configured to, following selection of the other resource slot of the wireless communication link between at least some of the sequence of the network nodes along the communication route between the one pair of the source and destination nodes:
- select one resource slot of a wireless communication link between each of a sequence of the network nodes along a communication route between another pair of the source and destination nodes; and
- select another resource slot of the wireless communication link between at least some of the sequence of the network nodes along the communication route between the another pair of the source and destination nodes.

20. The route determining network node of claim 16, further comprising:
- a network interface configured to communicate with the network nodes, wherein the processor circuitry and memory are configured to communicate a resource allocation message to each of the sequence of network nodes along the communication route between the one pair of the source and destination nodes to allocate the respective selected resource slots for communication of traffic in at least one direction between the one pair of the source and destination nodes.

21. The route determining network node of claim 16, wherein the processor circuitry and memory are further configured to modify the at least one metric for at least one of the resource slots of one of the network nodes responsive to a level of communication interference that will be created by an earlier selection of another one of the resource slots of the one of the network nodes.

22. The route determining network node of claim 21, wherein the processor circuitry and memory are configured to modify the at least one metric for at least one of the resource slots of one of the network nodes responsive to the level of communication interference by decreasing a communication rate indicated by the at least one metric, for the at least one of the resource slots of one of the network nodes, by an amount determined from the level of communication interference.

23. The route determining network node of claim 16, wherein the processor circuitry and memory are further configured to adjust a planned transmission power level of one of the resource slots of one of the network nodes that is being selected responsive to a level of communication interference that will be created by an earlier selection of another one of the resource slots.

24. The route determining network node of claim 16, wherein the processor circuitry and memory are further configured to respond to presence of a communication bottleneck in one of the network nodes along one of the communication routes which does not have a threshold available communication rate, by selecting at least one resource slot of a substitute other network node to bypass the bottleneck one of the network nodes.

* * * * *

UNITED STATES PATENT AND TRADEMARK OFFICE
CERTIFICATE OF CORRECTION

| | | |
|---|---|---|
| PATENT NO. | : 9,713,144 B2 | Page 1 of 2 |
| APPLICATION NO. | : 14/650499 | |
| DATED | : July 18, 2017 | |
| INVENTOR(S) | : Axnäs et al. | |

It is certified that error appears in the above-identified patent and that said Letters Patent is hereby corrected as shown below:

On the Title Page

In item (54), in Title, in Column 1, Line 2, delete "COMMUNICATION" and insert -- COMMUNICATIONS --, therefor.

In the Drawings

Figure 18:
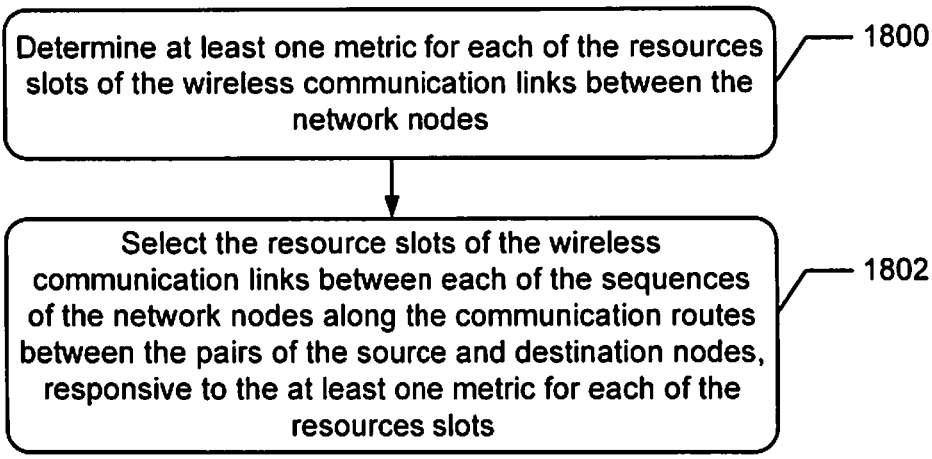
Figure 19:
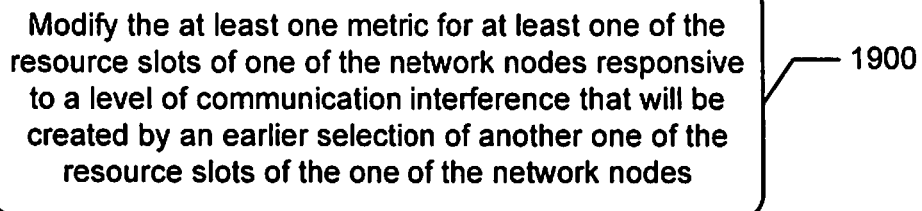
Figure 20:
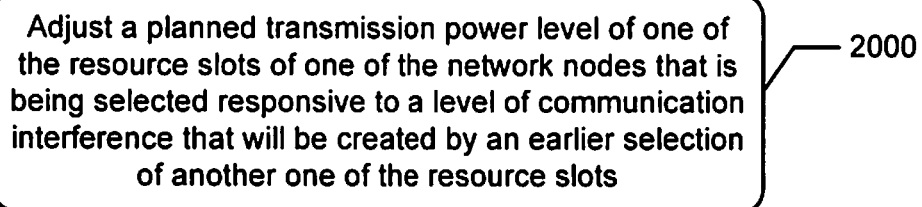

In Fig. 18, Sheet 9 of 10, for Step "1802", in Line 6, delete "resources" and insert -- resource --, therefor.

In the Specification

In Column 1, Line 2, delete "COMMUNICATION" and insert -- COMMUNICATIONS --, therefor.

In Column 1, Line 15, delete "traffic." and insert -- traffic, --, therefor.

In Column 1, Line 28, delete "sell-backhaul" and insert -- self-backhaul --, therefor.

In Column 5, Line 43, delete "M," and insert -- M --, therefor.

In Column 6, Line 64, delete "e=(v,v')" and insert -- e=(v,v'), --, therefor.

In Column 7, Line 7, delete "$v_l, (v_i,v_{i+1}),$" and insert -- $v_i, (v_i,v_{i+1})$, --, therefor.

In Column 7, Line 8, delete "$v_l \in V$" and insert -- $v_i \in V$ --, therefor.

In Column 7, Line 37, delete "$fv \neq fv(\tilde{V}')$" and insert -- $fv(\tilde{V}) \neq fv(\tilde{V}')$ --, therefor.

Signed and Sealed this
Fifth Day of December, 2017

Joseph Matal
*Performing the Functions and Duties of the*
*Under Secretary of Commerce for Intellectual Property and*
*Director of the United States Patent and Trademark Office*

CERTIFICATE OF CORRECTION (continued)
U.S. Pat. No. 9,713,144 B2

In Column 7, Line 44, delete "$f_V^{-1}(V')\equiv\{\tilde{v}\in\tilde{V}:f_V(\tilde{v})\in V'\}$," and insert -- $f_V^{-1}(V')\equiv\{\tilde{v}\in\tilde{V}:f_V(\tilde{v})\in V'\}$ --, therefor.

In Column 7, Line 47, delete "$v_k=f_V(\tilde{v}_{k,j})\in V'$," and insert -- $v_k=f_V(\tilde{v}_{k,j})\in V'$ --, therefor.

In Column 7, Line 47, delete "vertices V'" and insert -- vertices $\tilde{V}'$ --, therefor.

In Column 7, Line 48, delete "$f_V(\tilde{V}')\equiv\{f_V(\tilde{v}):\tilde{v}\in\tilde{V}'\}$" and insert -- $f_V(\tilde{V}')\equiv\{f_V(\tilde{v}):\tilde{v}\in\tilde{V}'\}$ --, therefor.

In Column 7, Line 51, delete "$\tilde{v}_{k,j}\in\tilde{V}'$," and insert -- $\tilde{v}_{k,j}\in\tilde{V}'$ --, therefor.

In Column 9, Line 56, delete "$\tilde{v}_{n-1}(d))$, then" and insert -- $\tilde{v}_{n-1}(d)))$, is then --, therefor.

In Column 10, Line 9, delete "pair))." and insert -- pair $(\tilde{v}_{n',1}(s),\tilde{v}_{n',1}(d)))$. --, therefor.

In Column 10, Line 60, delete "1108-114" and insert -- 1108-1114 --, therefor.

In Column 11, Line 54, delete "700-1,701-n" and insert -- 700-n,701-n --, therefor.

In Column 12, Line 46, delete "$P_{n,l}$" and insert -- $\tilde{P}_{n,l}$ --, therefor.

In Column 12, Line 47, delete "$\tilde{v}\notin f_V^{-1}(f_V(\tilde{V}(\tilde{P}_{n,l}))))$." and insert -- $\tilde{v}'\notin f_V^{-1}(f_V(\tilde{V}(\tilde{P}_{n,l}))))$. --, therefor.

In Column 12, Line 60, delete "$(\tilde{v}_{n,1}^{(s)},\tilde{v}_{n',1}^{(d)})$," and insert -- $(\tilde{v}_{n',1}^{(s)},\tilde{v}_{n',1}^{(d)})$ --, therefor.

In Column 14, Line 63, delete "resources" and insert -- resource --, therefor.

In Column 15, Line 2, delete "resources" and insert -- resource --, therefor.

In Column 17, Lines 57-58, delete "(DVD/BlueRay)." and insert -- (DVD/BluRay). --, therefor.